United States Patent [19]

Johnson

[11] 4,141,019
[45] Feb. 20, 1979

[54] PORTABLE COMPACT STRIP CHART RECORDER

[75] Inventor: Jerry E. Johnson, Bellevue, Wash.

[73] Assignee: Ryan Instruments, Inc., Kirkland, Wash.

[21] Appl. No.: 794,759

[22] Filed: May 9, 1977

[51] Int. Cl.$^2$ .................... G01D 15/24; G01D 9/00
[52] U.S. Cl. .................... 346/136; 346/33 TP
[58] Field of Search ............ 346/33 TP, 136, 139 R

[56] References Cited

U.S. PATENT DOCUMENTS

| 3,209,363 | 9/1965 | Virbila | 346/136 X |
| 3,743,201 | 7/1973 | Tarantino | 346/146 X |

FOREIGN PATENT DOCUMENTS

| 760401 | 10/1956 | United Kingdom | 346/33 TP |
| 1040637 | 9/1966 | United Kingdom | 346/136 |

*Primary Examiner*—George H. Miller, Jr.
*Attorney, Agent, or Firm*—Seed, Berry, Vernon & Baynham

[57] ABSTRACT

A portable strip chart recorder is provided with a constant speed strip chart advancing drive powered from a clockworks and gear drive unit. The gear drive unit is sealed from the strip chart so that it cannot be tampered with when the strip chart is changed. The constant speed drive comprises a constant speed sprocket spool which engages sprocket holes in a strip chart running between a feed spool and a take-up spool. The feed spool is provided with a drag to allow variations in the rotational speed of the strip chart on the spool and provide tension on the chart whereas the take-up spool is provided with a slip clutch that allows the chart to be wrapped at a constant tangential speed even though the diameter of the chart on the take-up spool varies.

3 Claims, 4 Drawing Figures

PORTABLE COMPACT STRIP CHART RECORDER

BACKGROUND OF THE INVENTION

1. Field of the Invention

This invention pertains to small lightweight waterproof strip chart recorders that are intended to be carried by hand and located at places where an environmental variable is to be measured for short periods of time such as 60, 90 or 180 days.

2. Description of the Prior Art

U.S. Pat. No. 3,487,691 illustrates a portable waterproof temperature recorder of which this invention is an improvement. In the patented recorder the strip chart take-up spool is driven at a constant rpm requiring that the chart paper have non-linear time graduations to compensate for changes in the diameter of the chart on the take-up spool. The use of non-linear time graduated paper is undesirable. Secondly, in the patented chart recorder the chart which is removed at frequent intervals for inspection or replacement was also in a compartment which revealed the drive mechanism. Frequently the drive mechanism was bumped or tampered with inadvertently which made it out of adjustment causing the subsequently recorded data to be unreliable.

SUMMARY OF THE INVENTION

It is an object of this invention to provide a linear chart drive for a lightweight portable recorder of the type shown in U.S. Pat. No. 3,487,691.

It is still another object of this invention to provide an improved linear strip chart drive for various types of portable strip chart recorders.

It is another object of this invention to provide a strip chart recorder in which the drive and gear mechanism is separated and isolated from the replaceable strip chart section to avoid tampering with the drive mechanism.

Basically these objects are obtained by providing a strip chart drive mechanism for a small lightweight recorder which has a sprocket spool rotated at a constant speed and having a plurality of circumferentially equidistantly spaced sprocket teeth. These teeth engage in equidistantly spaced sprocket teeth engaging holes in a strip chart which is suspended under slight tension between a feed spool and a take-up spool. The feed spool has a slight drag producing mechanism which allows the chart paper to be pulled from the spool under slight tension at a constant linear speed even though the diameter of the chart on the spool will vary during use. Similarly the take-up spool is provided with a slip clutch which will allow the paper to be fed onto the take-up spool at a constant linear speed even though the diameter of the chart on the take-up spool will vary during use.

In the preferred embodiment the strip chart recorder includes a case having a removable cover with the case having a chart containing end defined by the cover and a drive end sealed from the chart containing end by an intermediate plate. The intermediate plate must be physically removed by taking out fastening means so that it is difficult for the user of the chart recorder to get access to the clockworks or the gear drive unit for powering the strip chart.

DETAILED DESCRIPTION OF THE PREFERRED EMBODIMENTS OF THE INVENTION

Figure 1:
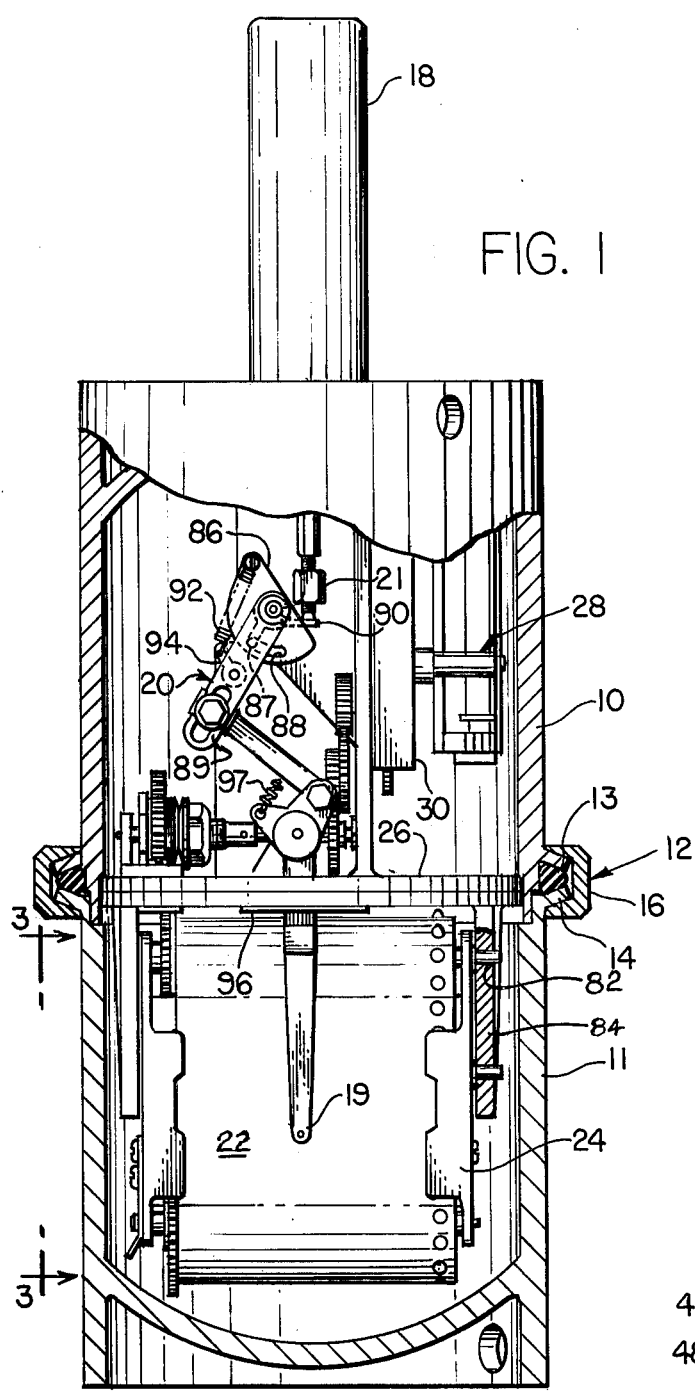
FIG. 1 is a diametrical section of the preferred portable strip chart recorder embodying the principles of the invention.
Figure 2:
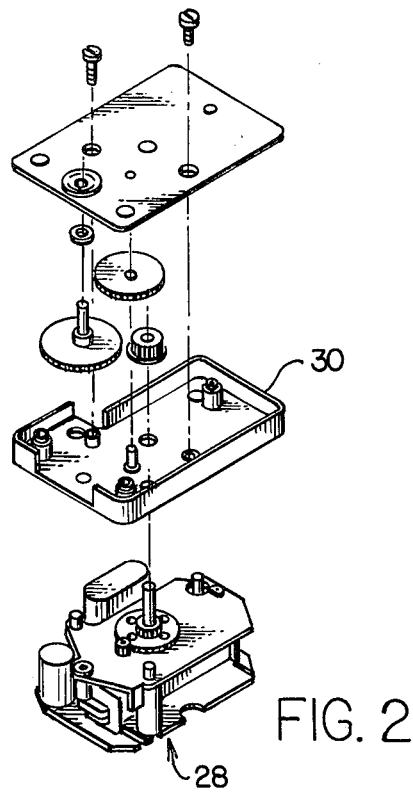
FIG. 2 is an exploded view of a clockworks and modular gear drive unit used in the recorder of FIG. 1.
Figure 3:
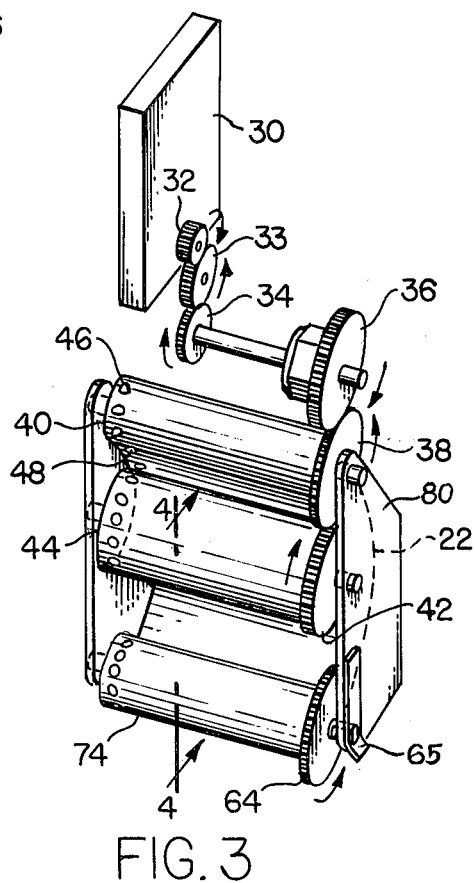
FIG. 3 is a schematic isometric of a strip chart linear drive mechanism employing the principles of the invention.
Figure 4:
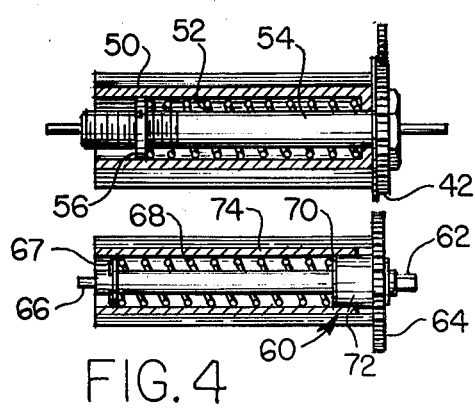
FIG. 4 is a fragmentary axial section taken through the feed out take-up spools of the strip chart drive shown in FIG. 3.

As best shown in FIG. 1 the strip chart recorder includes a case 10 having a removable cover 11 which is coupled to the case by a water tight seal 12. Preferably the seal includes an O-ring 13 squeezed between flanges 14 which are compressed together by beveled surfaces on a two-piece clamp 16. The sealing mechanism 12 is of conventional structure and will not otherwise be described.

The case 10 is provided with a temperature probe 18 that is coupled to a stylus 19 by a suitable amplifying mechanism 20 generally of the type shown in U.S. Pat. No. 3,487,691, the details of which are incorporated herein by reference thereto. Axial movement of the probe end 21 will provide pivotal movement of the stylus 19 across the strip chart 22 that is supported on a platen 24 positioned in the cover 11.

The case is sealed by an intermediate plate 26 with the cover containing a conventional battery powered clockworks 28 and a gear drive unit 30. The gear drive unit is provided with an output gear 32 that drives an intermediate gear 33 which in turn drives a gear 34. The gear 34 is fixed to a shaft which has on its opposite end a pinion gear 36. The pinion gear meshes with a gear 38 on drive sprocket spool 40. The gear 38 also meshes for synchronous rotation with a gear 42 that is on a take-up spool 44. The drive spool is provided with circumferentially spaced equidistantly spaced sprocket teeth 46 which engage in equidistantly spaced sprocket teeth engaging holes 48 in the chart 22. The gear 36 drives the sprocket teeth at a continuous rotational speed. The take-up spool is provided with a chart engaging roll 50 that is pushed against the gear 42 by a spring 52 which is wrapped around a threaded shaft 54. A stop washer 56 is threadably mounted on the shaft and can be threaded inwardly and outwardly to change the pressure caused by the spring and thus change the amount of slippage provided on the roll 50. As can be readily seen, by rotating the gear 36 the sprocket teeth 46 will move the strip chart paper at a constant linear speed with changes in diameter of the chart on the take-up spool being accommodated by the slip clutch between roll 50 and gear 42.

Strip chart paper is supplied to the sprocket from a feed spool 60 having a stationary shaft 66 and a knurled wheel 64. A catch 65 locks a rectangular shaft end 62 against rotation. The wheel 64 is rotatably mounted on the stationary shaft 66 which is provided with a spring clip 67 and a spring 68. The spring 68 pushes against a washer 70 which is abutted against a boss 72 formed on take-up roll 74. Thus the wheel 64 and its roll 74 can be rotated relative to the shaft 66 but only against the friction imposed by the washer 70. This friction between the roll and the stationary shaft provides a slight tension or drag on the strip chart as it is being removed from the varying diameter chart on the roll 74.

Preferably the axles for rolls 40 and 44 extend out beyond both sides of a chart holder 80. These axles then snap into slots 82 on a fixed stand 84 to secure the chart holder in the container. The slots are formed to accurately mesh gear 38 with gear 36. Suitable locking screws not shown will hold and lock the axles in the slots, if desired.

Operation of the chart recorder requires first that the desired drive ratio be determined from the gears within the gear drive unit 30 or by the selection of gears 32, 33, and 34. Next the chart holder 80 is removed and a new chart is slipped onto the feed spool 60. The chart is then threaded around the drive sprocket and onto the take-up spool. Next the chart holder 80 is snapped into the stand so that the gear 38 meshes with the gear 36. The clockworks is then started and the sprocket spool and take-up spool are driven in synchronism. The diameter of the take-up spool 44 is the same as the diameter of the drive sprocket 46 so that initially the take-up spool will rotate its roller 44 at the same rotational speed as the sprocket 40. As the roll of chart paper builds up on the take-up roll 44, however, the slip clutch will allow the roll to move more slowly rotationally relative to the sprockets so that the strip chart will not be pulled too tightly by the take-up spool. Similarly the change in diameter of the chart on the feed spool will be accommodated by the drag mechanism so that the paper can be fed off at the llinear speed.

In order to prevent damage from abnormal over temperature oscillation of the stylus or pen arm 19 a release mechanism is provided. The probe end 21 is abutted against an abutment 90 on a push rod lever 86 having a slot 88. The linkage 20 includes a center link 89 which rigidly supports a pin 87. The pin rests in slot 88 and a spring 92, coupled to an ear 94 on the link 89, holds the pin against the end of the slot. A weaker spring 97 pulls the pen arm 19 in a clockwise direction.

When the probe end makes an abnormal extension, the pen arm goes off scale and engages the end of slot 96. Further movement of the probe end is then relieved by movement of the slot 88 away from the pin 87. The accuracy of the recorder is not effected but costly repairs or recalibrations from abnormal temperature conditions are eliminated.

While the preferred embodiment of the invention has been illustrated and described it should be apparent that variations will be apparent to one skilled in the art without departing from the principles herein. Accordingly the invention is not to be limited to the specific embodiment illustrated in the drawing.

The embodiments of the invention in which a particular property or privilege is claimed are defined as follows:

1. A portable compact strip chart recorder comprising:
   a case having a removable cover,
   a clockworks in said case,
   a gear drive unit coupled to said clockworks,
   a transducer for measuring an external environmental condition, a stylus, means coupling said stylus to said transducer for movement in response to movements of the transducer, and
   a strip chart movement assembly including a feed spool rotatable about a first axis, a take-up spool rotatable about a second axis parallel to said first axis, a drive spool rotatable about a third axis parallel to said first and second axes, said drive spool containing equidistantly circumferentially spaced sprocket teeth, gear means coupling said drive spool to said gear drive unit for rotating said sprocket teeth at a constant speed, means coupling the drive spool to the take-up spool for synchronous rotation, said take-up spool having a chart engaging roll and slip clutch means separating the chart engaging roll from the synchronous drive coupling with the drive spool for providing variable rotation of the take-up chart engaging roll to accommodate variations in chart wrap diameter, said case being divided into a chart containing end and a probe end with the chart containing end being closed by a removable cover, an intermediate plate covering said probe end, means fastening the intermediate plate to the case, said clockworks and gear drive unit being housed within said probe end beneath said intermediate plate so that by opening said cover the strip chart only is exposed to the user.

2. A portable compact strip chart recorder comprising:
   a case having a removable cover,
   a clockworks in said case,
   a gear drive unit coupled to said clockworks,
   a transducer for measuring an external environmental condition, a multiplying linkage connected to said transducer, a stylus coupled to said linkage for movement in response to movements of the transducer, and
   a strip chart movement assembly including a feed spool rotatable about a first axis, a take-up spool rotatable about a second axis parallel to said first axis, a drive spool rotatable about a third axis parallel to said first and second axes, said drive spool containing equidistantly circumferentially spaced sprocket teeth, gear means coupling said drive spool to said gear drive unit for rotating said sprocket teeth at a constant speed, means coupling the drive spool to the take-up spool for synchronous rotation, said take-up spool having a chart engaging roll and slip clutch means separating the chart engaging roll from the synchronous drive coupling with the drive spool for providing variable rotation of the take-up chart engaging roll to accommodate variations in chart wrap diameter, said strip chart movement assembly including a chart holder, at least two of said spools having axles extending laterally outwardly of said holder, said case including slots positioned relative to said gear drive unit thereby locating said axles within said slots to accurately mesh said gear means with said gear drive unit for driving the strip chart, said case being divided into a chart containing end and a probe end with the chart containing end being closed by a removeable cover, or intermediate plate covering said probe end, means fastening the intermediate plate to the case, said clockworks and gear drive unit being housed within said probe end beneath said intermediate plate so that by opening said cover the strip chart only is exposed to the user.

3. The recorder of claim 2, said feed spool including a chart supporting roll and a stationary axle and drag means coupling the chart supporting roll to the axle for allowing variable rotation of the roll to accommodate changes in diameter of the chart on the roll.

* * * * *